(12) United States Patent
Hayashi et al.

(10) Patent No.: US 8,756,415 B2
(45) Date of Patent: Jun. 17, 2014

(54) MEMORY DEVICE, HOST DEVICE, AND MEMORY SYSTEM

(75) Inventors: Takamichi Hayashi, Tokyo (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 13/069,909

(22) Filed: Mar. 23, 2011

(65) Prior Publication Data

US 2011/0264911 A1    Oct. 27, 2011

(30) Foreign Application Priority Data

Apr. 1, 2010  (JP) ................ P2010-084839

(51) Int. Cl.
*H04L 29/06*    (2006.01)
(52) U.S. Cl.
USPC ........................................ 713/158

(58) Field of Classification Search
None
See application file for complete search history.

(56) References Cited

U.S. PATENT DOCUMENTS 8,140,843 B2 *  3/2012  Holtzman et al. ............ 713/157
2004/0268142 A1 * 12/2004  Karjala et al. ................ 713/200

* cited by examiner

*Primary Examiner* — Brandon Hoffman
(74) *Attorney, Agent, or Firm* — K&L Gates LLP

(57) ABSTRACT

A memory device includes: a storage section configured to store public key information of a certificate authority for verifying a certificate and revocation information for revoking illegal devices and to include a secret area for storing data of which the confidentiality is to be guaranteed; and a control section configured to have a function of communicating with an external device and to control access to the secret area of the storage section at least in accordance with the revocation information.

6 Claims, 17 Drawing Sheets

FIG. 9

| | INITIAL STATE | STATE IN WHICH SESSION KEY IS SHARED | STATE IN WHICH REVOCATION INFORMATION SYNCHRONIZATION IS COMPLETED |
|---|---|---|---|
| AUTHENTICATION SEQUENCE | OK | NG | NG |
| REVOCATION INFORMATION SYNCHRONIZATION SEQUENCE | NG | OK | NG |
| SECRETE AREA DATA ACQUISITION SEQUENCE | NG | NG | OK |

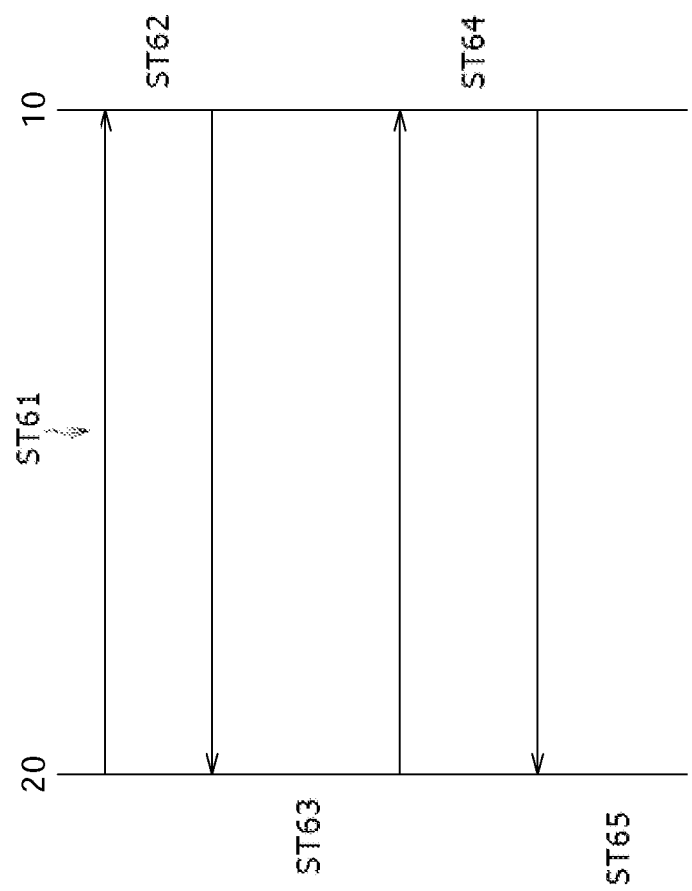

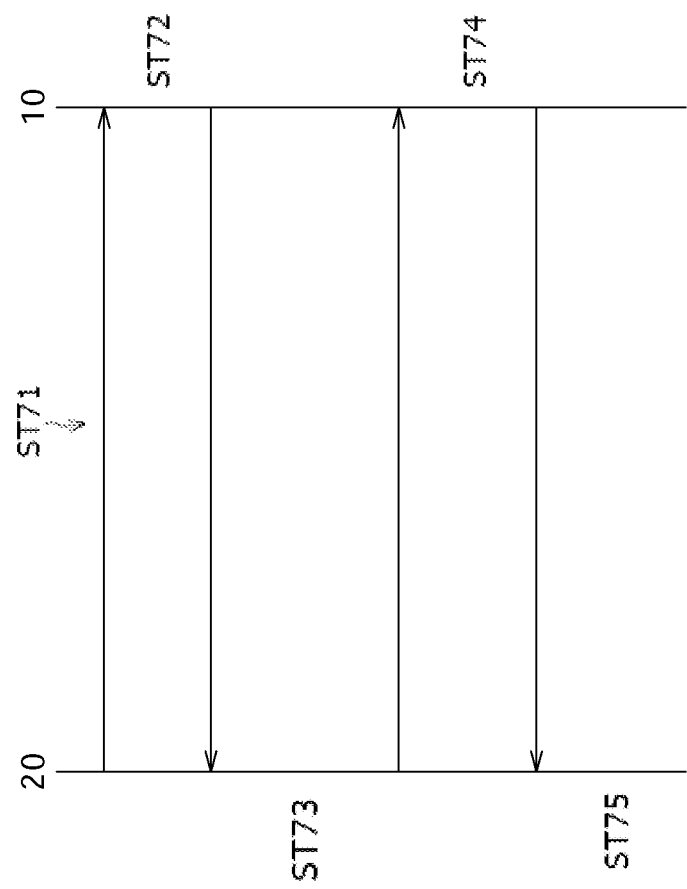

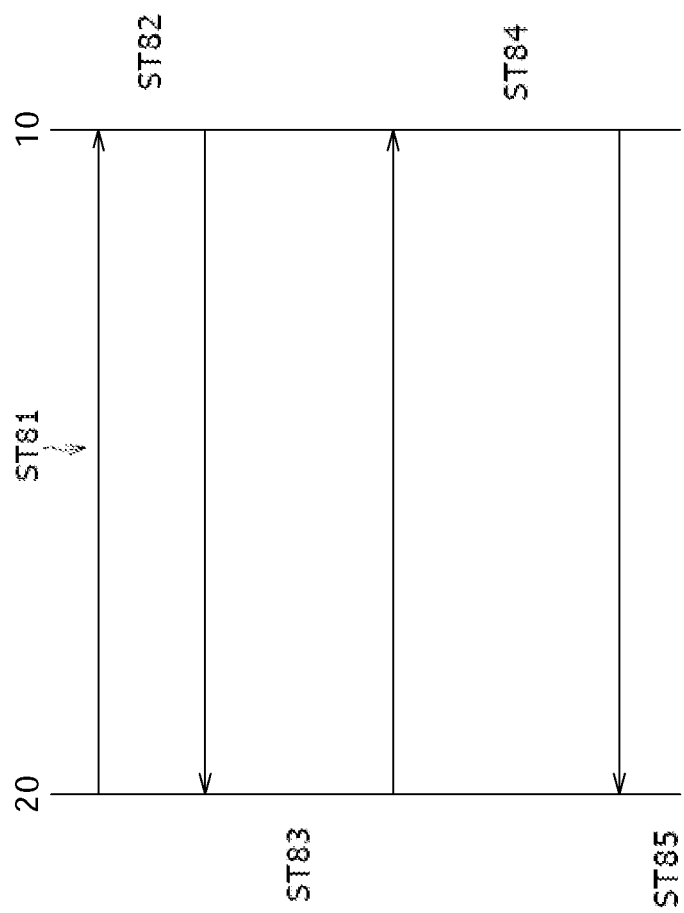

MEMORY DEVICE, HOST DEVICE, AND MEMORY SYSTEM

CROSS REFERENCES TO RELATED APPLICATIONS

The present application claims priority to Japanese Priority Patent Application JP 2010-084839 filed in the Japan Patent Office on Apr. 1, 2010, the entire content of which is hereby incorporated by reference.

BACKGROUND

The present application relates to a memory device containing a secret area that can be accessed by an authenticated host device, to such a host device, and to a memory system.

There exist memory devices each equipped with a flash memory and serving as an external storage device for use by host devices such as personal computers, digital still cameras, digital video cameras, video devices, and game consoles.

The above type of memory device used as the external memory device for diverse host devices has a secret area formed therein, as shown illustratively in FIG. 1, the secret area being accessible only by an authenticated host device.

SUMMARY

In the current state of the art, however, it is technically possible for the host device to access the secret area of the memory device without exchanging with the latter what is known as revocation information for revoking illegal memory devices and host devices.

In order to propagate revocation information between the memory device and the host device, there may be conceived a portion for allowing the device possessing new revocation information to transfer that information to the device possessing old revocation information. That portion may be defined as "revocation information synchronization."

Also in the current state of the art, the integrity of the data exchanged between the memory device and the host device during revocation information synchronization is not guaranteed.

That state can constitute the disadvantage of the inability to prevent a malicious third party from falsifying the data.

The present application has been made in view of the above circumstances and provides a memory device, a host device, and a memory system whereby the integrity of data exchanged between the memory device and the host device is guaranteed and whereby revocation information synchronization is protected against attacks from a malicious third party.

In carrying out the present application and according to one embodiment thereof, there is provided a memory device including: a storage section configured to store public key information of a certificate authority for verifying a certificate and revocation information for revoking illegal devices and to include a secret area for storing data of which the confidentiality is to be guaranteed; and a control section configured to have a function of communicating with an external device and to control access to the secret area of the storage section at least in accordance with the revocation information; wherein the control section has a function of exchanging the revocation information through communication between the memory device and the external device in such a manner that a new version of the revocation information is transferred from one of the two devices in possession thereof to the other device possessing an old version of the revocation information for revocation information synchronization between the two devices; and wherein the control section inhibits access to the secret area unless a process of revocation information synchronization is completed between the two devices.

According to another embodiment, there is provided a host device including: a storage device configured to store at least certificate information issued by a certificate authority, public key information of the certificate authority for verifying a certificate, and revocation information for revoking illegal devices; and a control section configured to control access to the storage device and to have a function of communicating with an external memory device including a secret area for storing data of which the confidentiality upon connection is to be guaranteed; wherein the control section has a function of exchanging the revocation information through communication between the host device and the external memory device in such a manner that a new version of the revocation information is transferred from one of the two devices in possession thereof to the other device possessing an old version of the revocation information for revocation information synchronization between the two devices; and wherein, upon completion of a process of revocation information synchronization between the two devices, the control section is allowed to access the secret area.

According to a further embodiment, there is provided a memory system including: a host device; and a memory device configured to communicate with the host device; the host device including: a storage device configured to store at least certificate information issued by a certificate authority, public key information of the certificate authority for verifying a certificate, and revocation information for revoking illegal devices; and a first control section configured to control access to the storage device and to have a function of communicating with an external memory device including a secret area for storing data of which the confidentiality upon connection is to be guaranteed; wherein the first control section has a function of exchanging the revocation information through communication between the host device and the external memory device in such a manner that a new version of the revocation information is transferred from one of the two devices in possession thereof to the other device possessing an old version of the revocation information for revocation information synchronization between the two devices; and wherein, upon completion of a process of revocation information synchronization between the two devices, the first control section is allowed to access the secret area; the memory device including: a storage section configured to store public key information of a certificate authority for verifying a certificate and revocation information for revoking illegal devices and to include a secret area for storing data of which the confidentiality is to be guaranteed; and a second control section configured to have a function of communicating with an external device and to control access to the secret area of the storage section at least in accordance with the revocation information; wherein the second control section has a function of exchanging the revocation information through communication between the memory device and the external device in such a manner that a new version of the revocation information is transferred from one of the two devices in possession thereof to the other device possessing an old version of the revocation information for revocation information synchronization between the two devices; and wherein the second control section inhibits access to the secret area unless a process of revocation information synchronization is completed between the two devices.

According to the present application embodied as outlined above, it is possible to guarantee the integrity of the data exchanged between the memory device and the host device and to protect the synchronization of revocation information therebetween against attacks from a malicious third party.

Additional features and advantages are described herein, and will be apparent from the following Detailed Description and the figures.

BRIEF DESCRIPTION OF THE FIGURES

FIG. 9 is a tabular view showing typical feasibilities of state-wise sequences used by the embodiment;

FIG. 15 is a schematic view explanatory of a first example of a revocation information synchronization sequence in which the memory device embodying the application is the principal actor;

FIG. 16 is a schematic view explanatory of a second example of the revocation information synchronization sequence in which the memory device embodying the application is the principal actor; and FIG. 17 is a schematic view explanatory of a third example of the revocation information synchronization sequence in which the memory device embodying the application is the principal actor.

DETAILED DESCRIPTION

Figure 1:
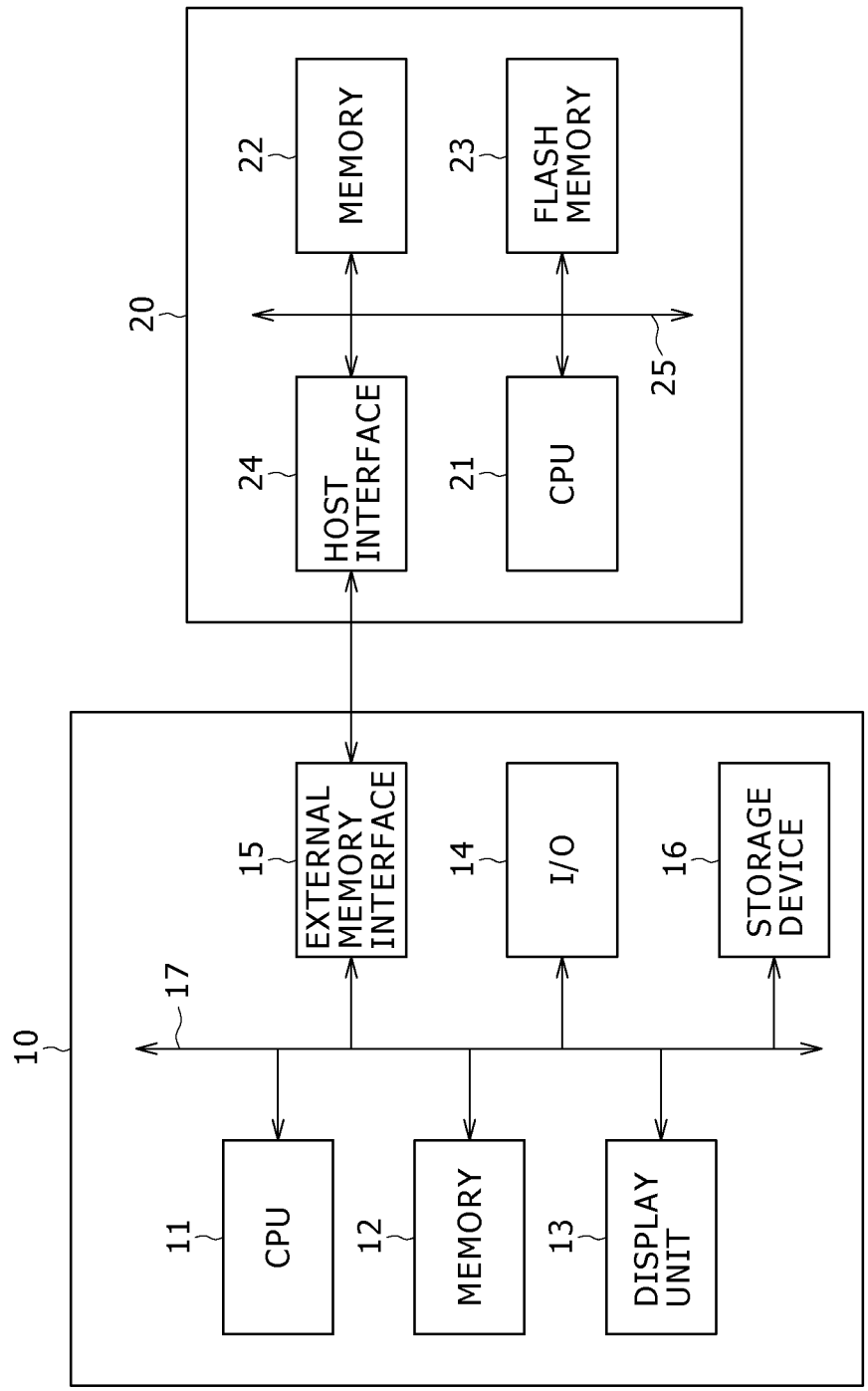
FIG. 1 is a schematic view showing an overall structure of a memory system as an embodiment.

Embodiments of the present application will be described below in detail with reference to the drawings.

1. Overall structure of the memory system as a whole

2. Typical structure of the main components of the memory device

3. Typical certificate of the memory device

4. Typical structure of the main components of the host device

5. Typical certificate of the host device

6. Communication sequences between the host device and the memory device

7. Memory device states

1. Overall Structure of the Memory System as a Whole

FIG. 1 is a schematic view showing an overall structure of a memory system as an embodiment.

As shown in FIG. 1, this memory system includes, as its main components, a host device 10 and a memory device 20 that can be removably attached to the host device 10. In this embodiment, the memory device 20 has a flash memory that serves as a nonvolatile memory.

The memory system of this embodiment constitutes a system that revokes any illegal host device 10 or any illegal memory device 20 by propagating revocation information between the devices involved.

To propagate the revocation information between the memory device 20 and the host device 10 demands a function of having a new version of the revocation information transferred from one of the two devices in possession thereof to the other device possessing an old version of the revocation information. With this embodiment, that function is defined as the synchronization of revocation information.

The memory system of this embodiment has the following two basic features that are configured to protect the synchronization of revocation information against attacks from a malicious third party:

The first feature involves inhibiting the host device 10 from accessing a secret area of the memory device 20 unless the revocation information is synchronized therebetween.

The second feature involves allowing the memory device 20 and the host device 10 to authenticate each other and to share a session key therebetween so that the memory device 20 and host device 10 may add their signatures using the session key to the data exchanged therebetween at the time of revocation information synchronization.

The host device 10 is composed of any one of such electronic devices as a personal computer, a digital still camera, a digital video camera, a video device, and a game console.

The host device 10 includes a CPU (central processing unit) 11 that functions as a first control section, a memory 12, a display unit 13, an input/output (I/O) process section 14, and an external memory interface (I/F) 15.

The host device 10 includes a storage device 16 that stores user data and highly confidential data. The storage device 16 will be explained later.

The CPU 11 is interconnected with the memory 12, display unit 13, I/O section 14, external memory interface 15, and storage device 16 via a bus 17.

The memory 12 includes a ROM (read-only memory) for storing programs and a RAM (random access memory) serving as a working memory. The external memory interface 15 allows data to be exchanged with the memory device 20 under control of the CPU 11.

The memory device 20 includes a CPU 21 that functions as a second control section, a memory 22, a flash memory 23, and a host interface 24.

The CPU 21 is interconnected with the memory 22, flash memory 23, and host interface 24 via a bus 25. The memory 22 generally includes a ROM for storing programs and a RAM acting as a working memory.

The flash memory 23 is typically composed of a NOR (not or)-type or NAND (not and)-type flash memory (nonvolatile memory).

The host interface 24 allows data to be exchanged with the host device 10 under control of the CPU 21.

2. Typical Structure of the Main Components of the Memory Device

A more detailed structure of the memory device 20 is explained first.

Figure 2:
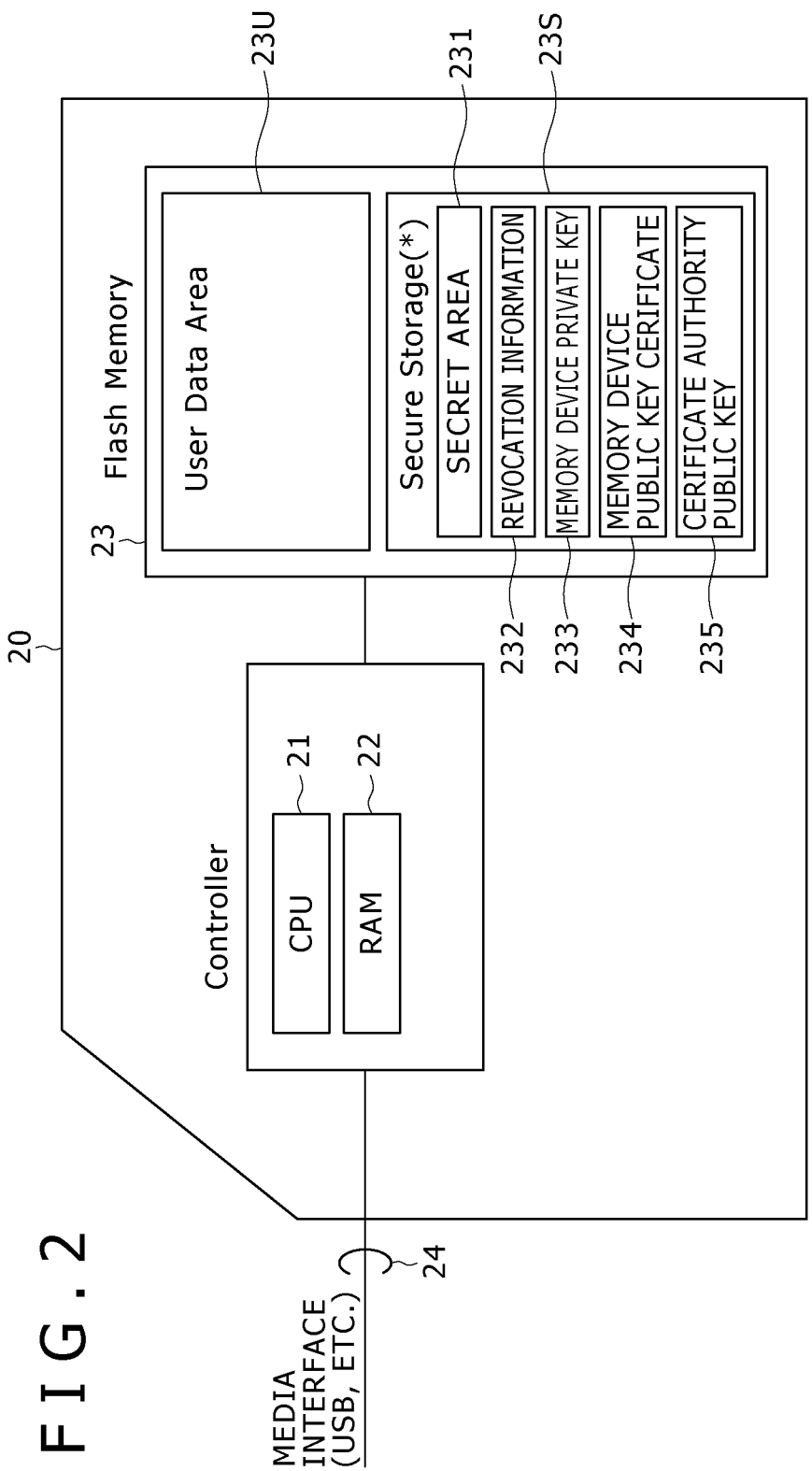
FIG. 2 is a block diagram showing a structure of the main components of a memory device as another embodiment.

FIG. 2 is a block diagram showing a typical structure of the main components of the memory device 20 indicated in FIG. 1.

As shown in FIG. 2, the memory device 20 is typically a plate-like memory card. When attached to the host device 10, the memory device 20 is accessed following authentication by the host device 10 so that data is written to and read from the memory device 20 by the host device 10.

The memory device 20 of this embodiment has the function of authenticating the host using public key cryptography (PKI).

The host device 10 cannot access the secret area of the memory device 20 unless revocation information is synchronized therebetween.

Prior to revocation information synchronization, the memory device 20 performs authentication, and shares a session key, with the host device 10. Using the session key, the memory device 20 adds a signature to the data that is exchanged with the host device 10 upon revocation information synchronization.

The flash memory 23 in the memory device 20 of this embodiment is partitioned into a user data area 23U to and from which user data is written and read, and a secret storage area 23S that is guaranteed of data integrity and confidentiality.

The secret storage area 23S includes a secret area 231 for storing the data of which the confidentiality and integrity must be guaranteed, and a revocation information area 232 for storing revocation information.

The secret storage area 23S includes an area 233 for storing an RSA (Rivest-Shamir-Adleman) secret key of the memory device 20 issued by a certificate authority, and a memory device public key certificate area 234 for storing an RSA public key certificate of the memory device 20 issued by the certificate authority.

The public key certificate is supplemented with a signature based on the RSA secret key of the certificate authority, and includes the ID (identification) of the memory device 20.

The secret storage area 23S includes a certificate authority public key information area 235 for authenticating the public key certificate of the host device 10.

The secret area 231 is partitioned into a plurality of secret data areas that are typically assigned addresses #0 through #3 or identified otherwise.

Figure 3:
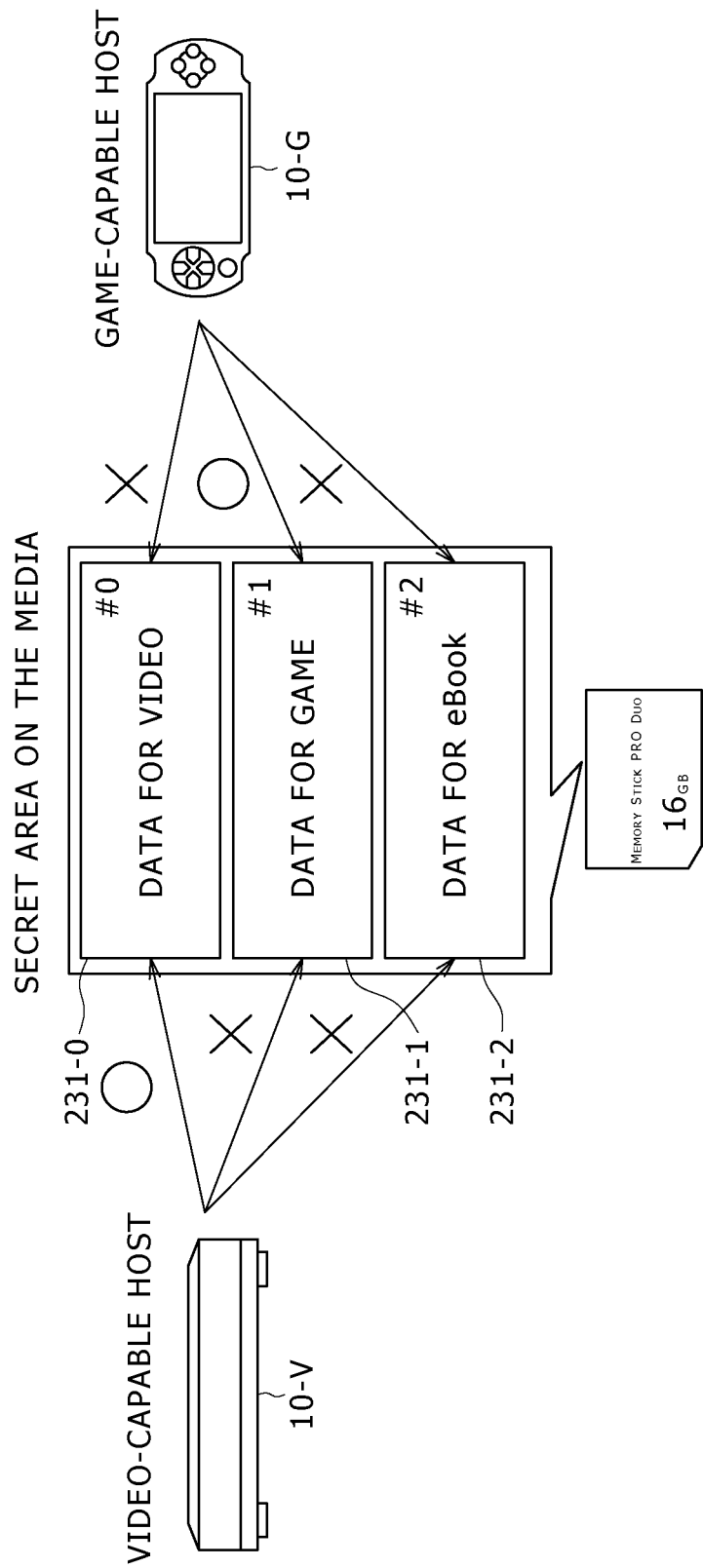
FIG. 3 is a schematic view explanatory of typical data written to a secret area used by the embodiment.

The secret area 231 of the secret storage area 23S can be accessed only by the host device 10 authenticated by the memory device 20. As shown in FIG. 3, the secret area 231 is partitioned into detailed areas to which data is to be written separately by application.

In the example of FIG. 3, video device data is written to a secret data area 231-0 to which address #0 is assigned, and game console data is written to a secret data area 231-1 to which address #1 is assigned. Also, electronic book (eBook) data is written to a secret data area 231-2 to which address #2 is assigned.

As described above, the data that must not be falsified or peeked at is written to the secret area 231.

Examples of the data that must not be falsified include right-to-content information (view time limit, reproduction count, etc.) and user ID's for distribution services.

Examples of the data that must not be peeked at include keys to decrypting encrypted content, passwords for distribution services, and credit card numbers.

Figure 4:
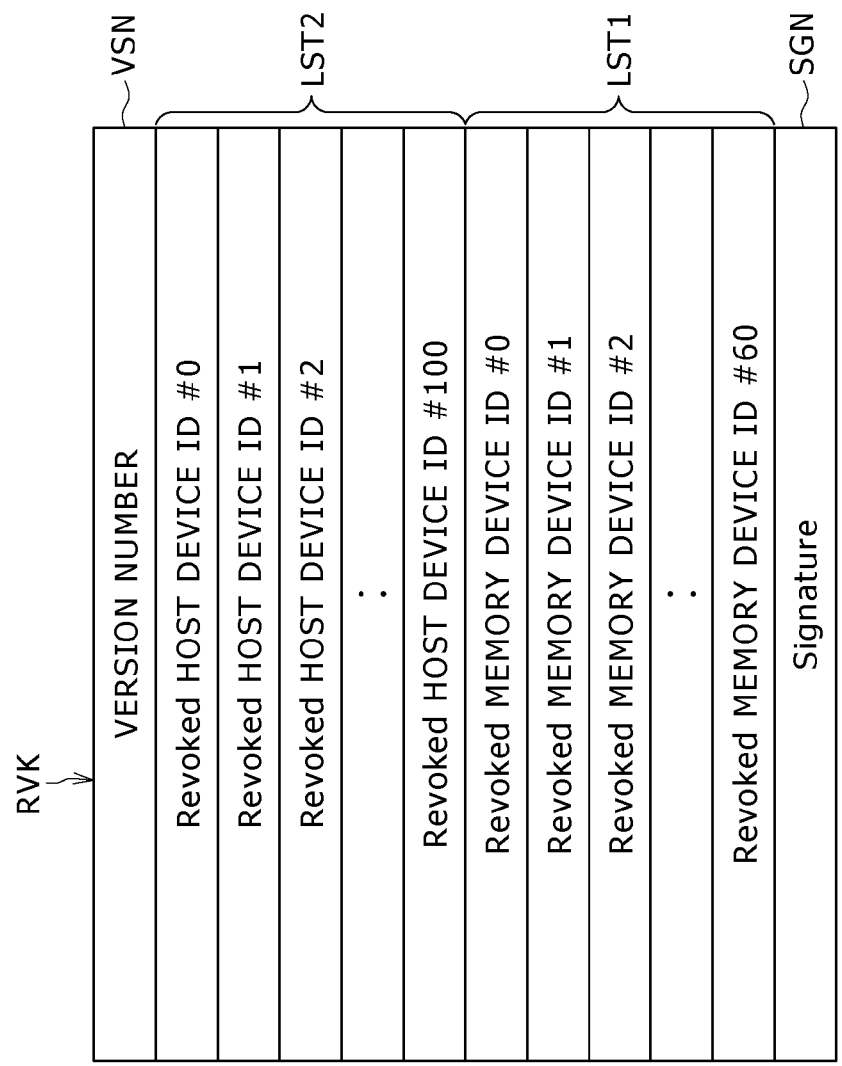
FIG. 4 is a schematic view showing revocation information used by the embodiment.

FIG. 4 is a schematic view showing revocation information used by this embodiment.

Revocation information RVK is constituted by a list LST1 composed of the memory device ID's of revoked memory devices (#0 through #60) and by a list LST2 made of the host device ID's of revoked host devices (#0 through #100). The memory device ID's (#0 through #60) constitute 12-byte information for identifying the memory devices. The host device ID's (#0 through #100) make up six-byte information for identifying the host devices.

The revocation information RVK is supplemented with a version number VSN. The larger the version number VSN, the more recent the revocation information is.

The revocation information RVK is issued by the certificate authority.

A signature SGN is added to the revocation information using an RSA secret key of the certificate authority.

The memory device 20 and host device 10 can authenticate each other's signature using an RSA public key of the certificate authority.

3. Typical Certificate of the Memory Device

Figure 5:
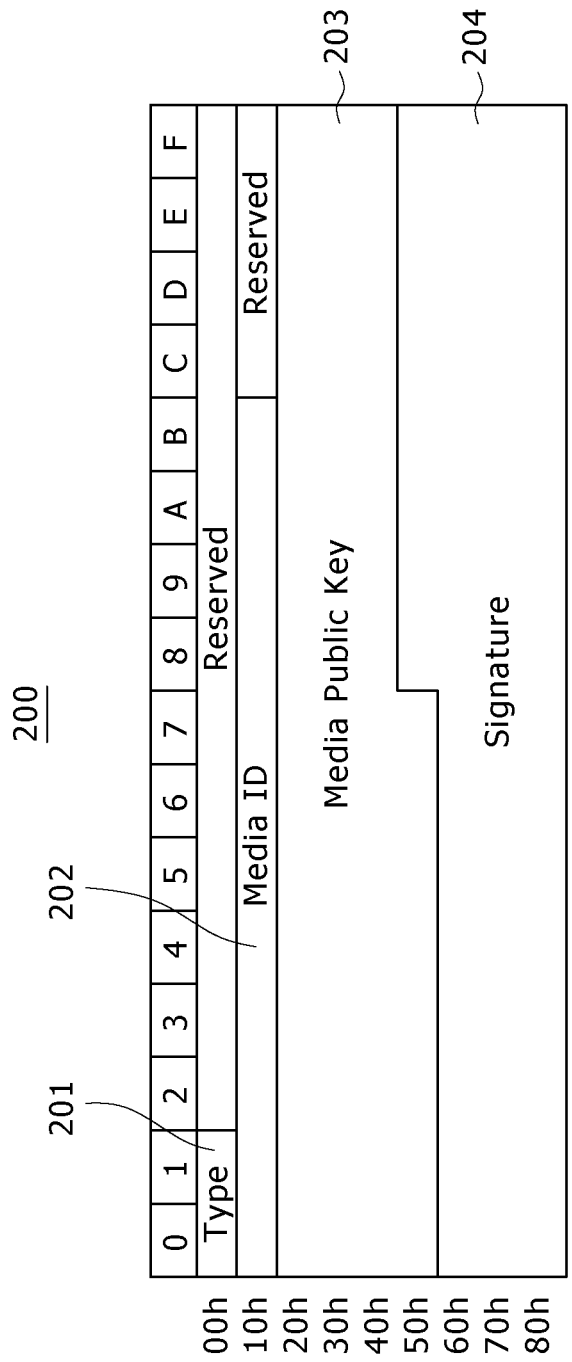
FIG. 5 is a schematic view showing a typical certificate of the memory device embodying the application.

FIG. 5 is a schematic view showing a typical certificate of the memory device 20 embodying the application.

A certificate 200 shown in FIG. 5 includes a type area 201, a media ID area 202, a media public key area 203, and a signature area 204.

The type area 201 is formed by two bytes and stores a value indicating the type of certificate. Specifically, the type area 201 accommodates 0002h (=Media).

The media ID area 202 is formed by 16 bytes and stores the media ID of the memory device 20.

The media public key area 203 is formed by 56 bytes and stores the public key of the memory device 20 for authentication purposes.

The signature area 203 is formed by 56 bytes and stores the signature based on a secret key.

For example, the signature is generated using the following calculating formula:

$$ECDSA\_Sign(LApriv, D)$$

where, D stands for [00h-57h] in the certificate 200 of the memory device 20. Upon authentication, the signature is verified using the following calculating formula:

$$ECDSA\_Verify(LApub, Signature, D)$$

The CPU 21 serving as the control section of the memory device 20 has the function of synchronizing the revocation information with the host device 10.

The CPU 21 also has the function of performing authentication and sharing a session key with the host device 10 prior to revocation information synchronization, and of adding the signature using the session key to the data exchanged with the host device 10 when revocation information synchronization is carried out.

These functions prevent the host device 10 from accessing secret data of the memory device 20 without synchronizing the revocation information RVK with the latter. Thus if a third party blocks revocation information synchronization, the host device 10 will fail to acquire the secret data.

The data exchanged during synchronization of the revocation information RVK is guaranteed of its integrity using the signature based on the session key acquired upon authentication. This arrangement permits detection of possible data replacement attempted by a third party.

Because synchronization of the revocation information RVK is always carried out in conjunction with authentication, it is easy to propagate the revocation information RVK.

The CPU 21 has the function of authenticating the public key certificate from the host device 10 and, following the authentication, of identifying the attribute information attached to the public key certificate and thereby limiting the secret area on the media that can be accessed by the host device 10.

In the manner described above, this embodiment utilizes public key cryptography for authentication between the host device 10 and the memory device 20.

The CPU 21 possesses the function of carrying out such authentication.

The CPU 21 serving as the first control section has a revocation information synchronization function of having a new version of the revocation information transferred from one of the memory device 20 and host device 10 in possession thereof to the other device possessing an old version of the revocation information.

The CPU 21 then has the function of inhibiting the host device 10 from accessing the secret area unless revocation information synchronization is carried out between the host device 10 and the memory device 20.

The CPU 21 has the function of performing authentication and sharing a session key with the host device 10 prior to revocation information synchronization, and of adding the signature using the session key to the data exchanged with the host device 10 when revocation information synchronization is carried out.

Upon receipt of the certificate information authenticated by the certificate authority from the host device 10, the CPU 21 acquires ID information for identifying at least the host device 10, adds the signature to its own certificate authenticated by the certificate authority, and transmits the certificate together with authentication information to the host device 10.

The CPU 21 receives an encrypted signature from the host device 10 in response to the transmitted authentication information, verifies the signature, decrypts an encrypted session key received together with the signature, and shares the session key with the host device 10.

The CPU 21 has the function of transmitting newness information about the revocation information upon receipt of a request to transmit such newness information which, with this embodiment, is constituted by version information.

In response to the above transmission, the CPU 21 receives from the host device 10 notification information indicating whether the versions of the revocation information possessed by the two devices involved are the same or one of the two versions is newer than the other, and carries out a process reflecting the notification information to complete the process of revocation information synchronization.

More specifically, upon receipt of the notification information indicating that the versions of the revocation information possessed by the two devices are the same, the CPU 21 verifies that the host device 10 from which the notification information was transmitted is not included in the revocation information held in the flash memory 23. Upon successful conclusion of the verification, the CPU 21 completes the process of revocation information synchronization.

Upon receipt of the notification information indicating that the version of the own revocation information is the older, the CPU 21 verifies the signature received together with the notification information and compares the version information about the revocation information of the host device 10 included in the notification information with the version information that was transmitted to the latter.

The CPU 21 verifies that the own revocation information is the older and updates the revocation information held in the flash memory 23 using the received revocation information.

The CPU 21 then verifies that the host device 10 from which the notification information was transmitted is not included in the revocation information held in the flash memory 23. Upon successful conclusion of the verification, the CPU 21 completes the process of revocation information synchronization.

Upon receipt of a request as part of the notification information from the host device 10 to transmit the revocation information held in the flash memory 23, the CPU 21 recognizes that the own revocation information is the newer.

The CPU 21 then verifies that the external device from which the notification information was transmitted is not included in the revocation information held in the flash memory 23. Upon successful conclusion of the verification, the CPU 21 transmits the revocation information to the host device 10 to complete the process of revocation information synchronization.

The CPU 21 has the function, upon receipt of a request for the data of the secret area, of transmitting the requested data of the secret area after verifying that the process of revocation information synchronization is completed.

4. Typical Structure of the Main Components of the Host Device

A more detailed structure of the host device 10 is explained below.

Figure 6:
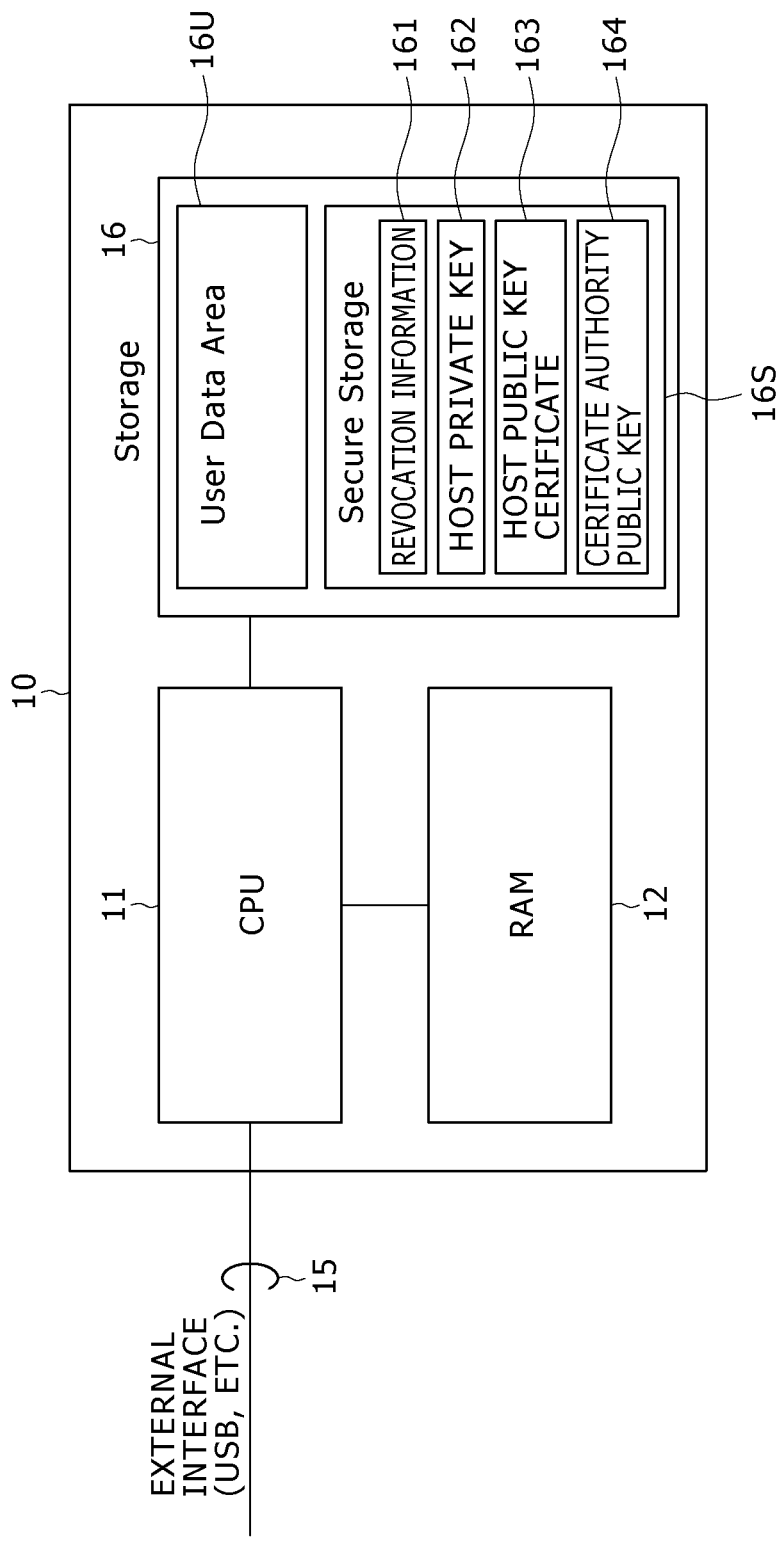
FIG. 6 is a block diagram showing a structure of the main components of a host device as another embodiment.

FIG. 6 is a block diagram showing a typical structure of the main components of the host device 10 indicated in FIG. 1.

The host device 10 shown in FIG. 6 includes a CPU 11 that serves as the first control section, a memory 12 (RAM), and a storage device 16.

The storage device 16 in the host device 10 of this embodiment is partitioned into a user data area 16U to and from which user data is written and read, and a secret storage area 16S that is guaranteed of data integrity and confidentiality.

The secret storage area 16S includes a revocation information area 161 for storing revocation information, and a secret key information area 162 for storing the secret key information of the host device 10.

The secret storage area 16S includes a memory device public key certificate area 163 for storing an RSA public key certificate of the host device 10 issued by the certificate authority.

The public key certificate is supplemented with a signature based on an RSA secret key of the certificate authority, and includes the ID of the host device 10.

The secret storage area 16S includes a host public key information area 164 for storing the RSA public key information of the host device 10 issued by the certificate authority.

The public key certificate of the host device 10 describes basically the following data: the public key of the host device 10, addresses (#0 through #3, etc.) of the secret data in the memory device 20 that can be accessed by the host device 10, and a signature based on a secret key of the certificate authority.

5. Typical Certificate of the Host Device

Figure 7:
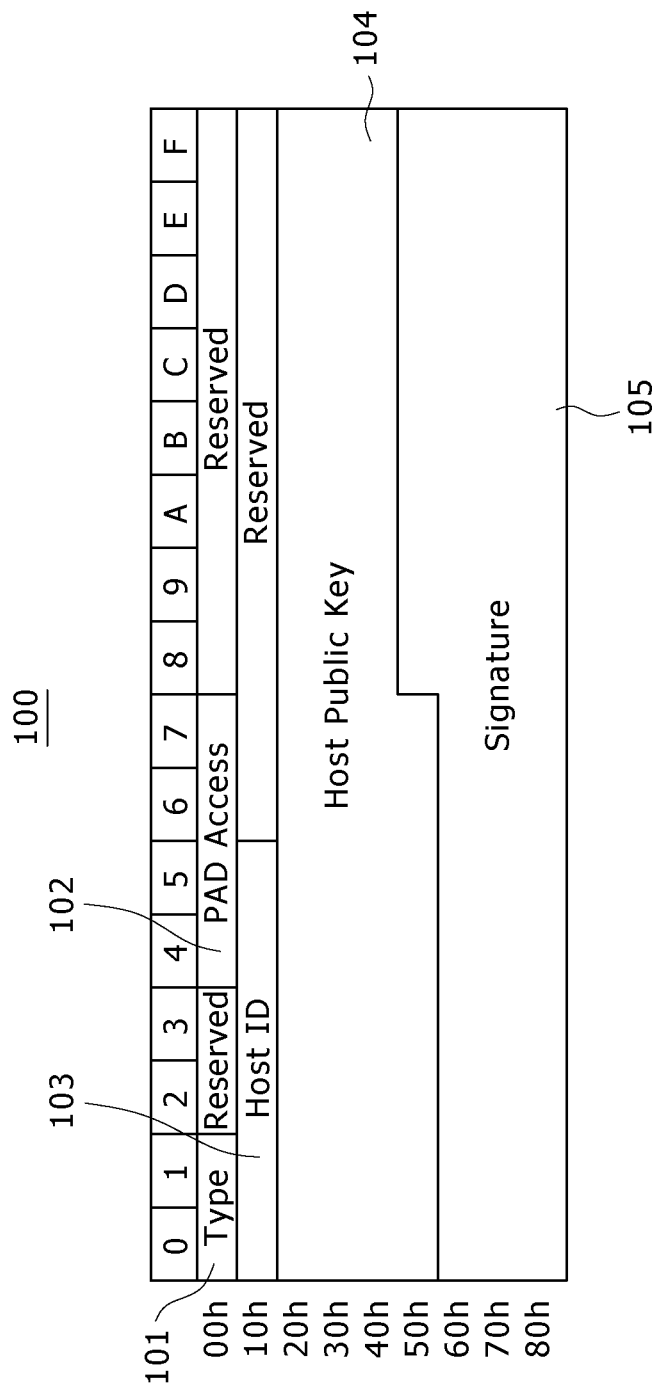
FIG. 7 is a schematic view showing a typical certificate of the host device embodying the application.

FIG. 7 is a schematic view showing a typical certificate of the host device 10 embodying the application.

A host certificate 100 shown in FIG. 7 has a type area 101, a PAD (Protected Area Data) access area 102, and a host ID area 103.

The host certificate 100 also has a host public key area 104 and a signature area 105.

The type area 101 is formed by two bytes and stores a value indicating the type of certificate. Specifically, the type area 101 accommodates 0001h (=Host).

The host ID area 103 is formed by six bytes and stores the host ID of the host device 10.

The host public key area 104 is formed by 56 bytes and stores the public key of the host device 10 for authentication purposes.

The signature area 105 is formed by 56 bytes and stores the signature based on a secret key.

For example, the signature is generated using the following calculating formula:

ECDSA_Sign(LApriv,D)

where, D stands for [00h-57h] in the host certificate 100 of the host device 10. Upon authentication, the signature is verified using the following calculating formula:

ECDSA_Verify(LApub, Signature,D)

The CPU 11 serving as the first control section has the function of communicating with the memory device 20.

The CPU 11 also has a revocation information synchronization function of having a new version of the revocation information transferred from one of the memory device 20 and host device 10 in possession thereof to the other device possessing an old version of the revocation information.

Upon completion of revocation information synchronization, the CPU 11 is allowed by the memory device 20 to access the secret area thereof.

The CPU 11 also has the function of performing authentication and sharing a session key with the memory device 20 prior to revocation information synchronization, and of adding the signature using the session key to the data to be sent to the memory device 20 when revocation information synchronization is carried out.

The CPU 11 receives a certificate and signature information from the memory device 20 in response to the transmitted certificate information authenticated by the certificate authority, verifies the received certificate, and acquires at least ID information for identifying the memory device 20.

The CPU 11 transmits an encrypted session key and the signature to the memory device 20, and receives a process complete notification in response to the transmission thereby verifying that the session key is shared with the memory device 20.

The CPU 11 receives from the memory device 20 newness information about the revocation information possessed by the latter in response to a request to send such newness information which, with this embodiment, is constituted by version information. Given the response, the CPU 11 verifies whether the versions of the revocation information possessed by the host device and the external memory device are the same or one of the two versions is newer than the other.

The CPU 11 transmits the result of the above verification as notification information to the memory device 20, receives a process complete notification from the memory device 20, and verifies that the memory device 20 to which the notification information was transmitted is not included in the revocation information of the storage device 16.

After verifying that the revocation information of the storage device 16 is newer than the received revocation information, the CPU 11 transmits the revocation information of the storage device 16 and the signature as notification information to the memory device 20.

Upon receipt of a process complete notification from the memory device 20, the CPU 11 verifies that the memory device 20 to which the notification information was transmitted is not included in the revocation information of the storage device 16.

When verifying that the revocation information of the storage device 16 is older than the received revocation information, the CPU 11 can receive the revocation information of the memory device 20 in response to a request transmitted thereto to send the revocation information thereof.

The CPU 11 then verifies the received revocation information and updates the revocation information of the storage device 16 using the received revocation information. After the update, the CPU 11 verifies that the memory device 20 to which the notification information was transmitted is not included in the revocation information of the storage device 16.

6. Communication Sequences Between the Host Device and the Memory Device

The communication sequences between the host device 10 and the memory device 20 of this embodiment will now be explained below.

The communication sequences between the host device 10 and the memory device 20 basically include an authentication sequence, a revocation information synchronization sequence, and a secret area data acquisition sequence.

Authentication Sequence

In the authentication sequence, the host device 10 and memory device 20 communicate with each other in accordance with a protocol involving authentication and the sharing of a session key therebetween. The sequence will be discussed later in more specific terms.

Revocation Information Synchronization Sequence

In the revocation information synchronization sequence, the host device 10 and memory device 20 communicate with each other in accordance with a protocol involving synchronization of the revocation information RV therebetween.

In the case above, there may be three kinds of sequence: a sequence in which the revocation information RVK of the host device 10 is the same as the revocation information RVK of the memory device 20, a sequence in which the revocation information RVK of the host device 10 is newer than that of the memory device 20, and a sequence in which the revocation information RVK of the memory device 20 is newer than that of the host device 10.

These sequences will be discussed later in more specific terms.

Secret Area Data Acquisition Sequence

In the secret area data acquisition sequence, the host device 10 communicates with the memory device 20 in accordance with a protocol allowing the host device 10 to acquire data from the secret area of the memory device 20.

The sequence will be discussed later in more specific terms.

7. Memory Device States

Figure 8:
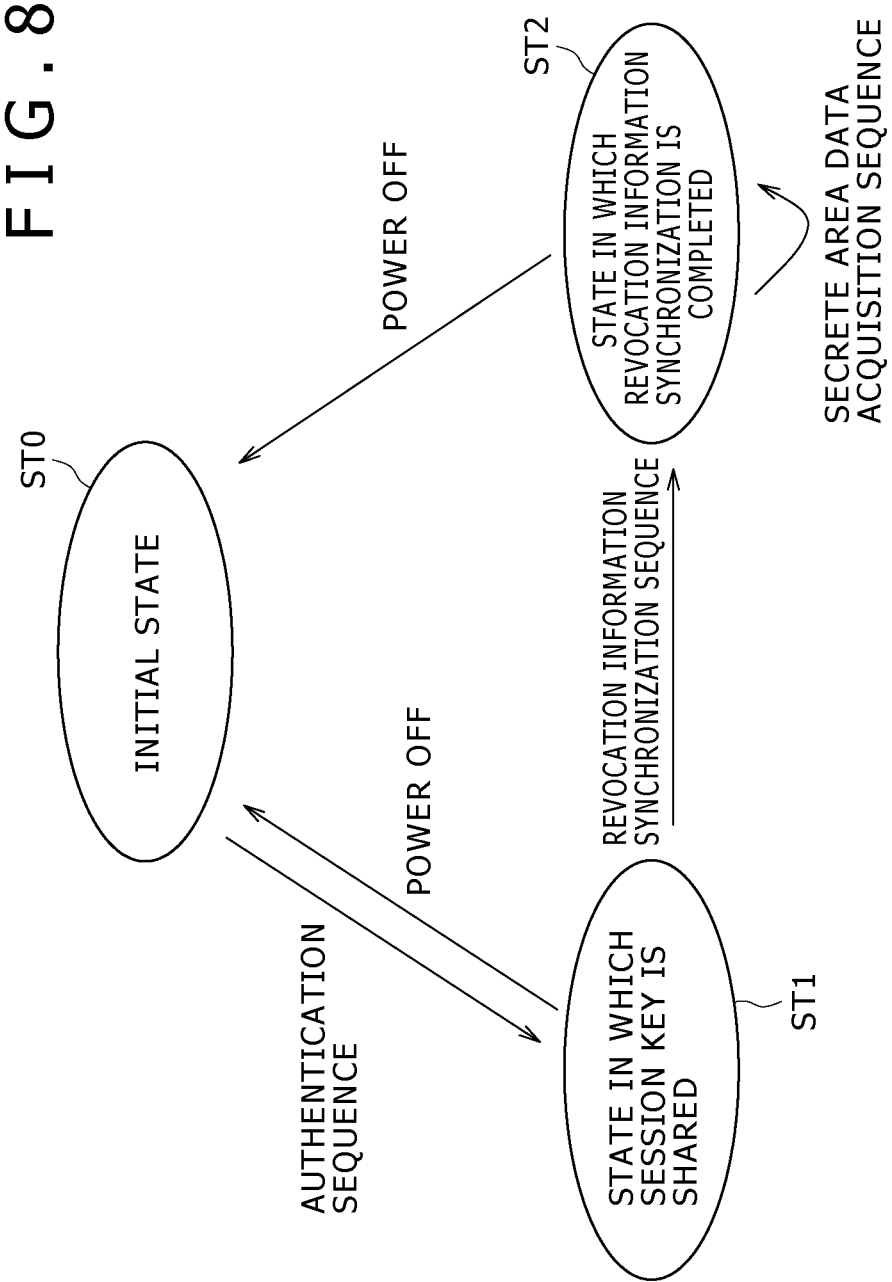
FIG. 8 is a state transition diagram applicable to the memory device embodying the application.

FIG. 8 is a state transition diagram applicable to the memory device 20 embodying the application.

The memory device 20 of this embodiment may basically enter one of three states: an initial state ST0, a state ST1 in which the session key is shared, and a state ST2 in which revocation information synchronization is completed. The memory device 20 transits from one state to another.

Initial State ST0

The initial state ST0 is entered immediately after the memory device 20 is switched on.

State ST1 in which the Session Key is Shared

As its name implies, the state ST1 is a state in which the session key is shared between the host device 10 and the memory device 20.

Following the authentication sequence in the initial state ST0, a transition is effected to this state ST1 in which the session key is shared.

State ST2 in Which Revocation Information Synchronization is Completed

As its name implies, the state ST2 is a state in which synchronization of the revocation information RVK is completed between the host device 10 and the memory device 20.

Following the revocation information synchronization sequence in the state ST1 in which the session key is shared, a transition is effected to the state ST2 in which revocation information synchronization is completed.

FIG. 9 is a tabular view showing typical feasibilities of the state-wise sequences used by the embodiment.

As shown in FIG. 9, the authentication sequence can be performed in the initial state.

The revocation information synchronization sequence can be performed in the state in which the session key is shared.

The secret area data acquisition sequence can be performed in the state in which revocation information synchronization is completed.

As the communication sequence between the host device 10 and the memory device 20, one of the three sequences above is basically carried out. Below is a detailed description of these sequences: authentication sequence, revocation information synchronization sequence, and secret area data acquisition sequence.

The memory system embodying the present application performs its processing in accordance with a protocol by which authentication is performed and a key is exchanged between the host device 10 and the memory device 20 so that the two devices may share a bus key therebetween.

In the memory system, a challenge-response scheme is used for effecting authentication between the host device 10 and the memory device 20.

Also in the memory system, an ECDH (Elliptic Curve Diiffie-Hellma) protocol is used for the exchange of keys between the host device 10 and the memory device 20.

Figure 10:
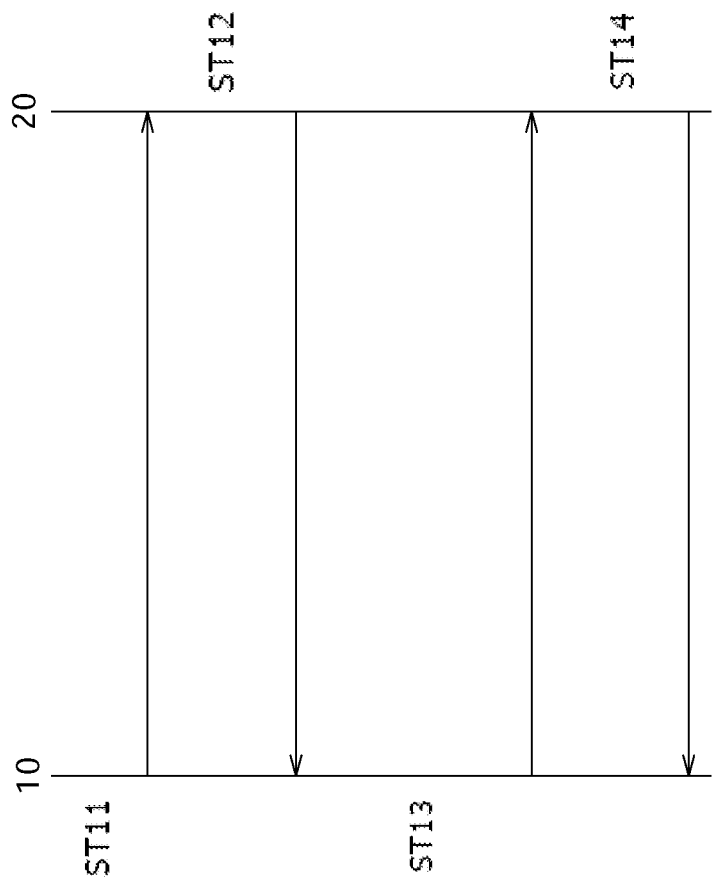
FIG. 10 is a schematic view explanatory of an authentication sequence between the host device and the memory device both embodying the application.

FIG. 10 is a schematic view explanatory of the authentication sequence between the host device 10 and the memory device 20 both embodying the application.

Step ST11

In step ST11, the host device 10 generates a random number H of tens or hundreds of bits.

The host device 10 transmits the random number H and a host certificate Hcert to the memory device 20 in the initial state ST0 (Challenge by Host).

Step ST12

In step ST12, the memory device 20 verifies that the type of the host certificate Hcert is 0001h. The memory device 20 also verifies the signature of the host certificate Hcert.

If the verification is unsuccessful, the protocol is halted.

If the verification is successfully concluded, the memory device 20 acquires a public key Hpub and a host device ID from the host device 10.

The memory device 20 generates a random number M of tens of or hundreds of bits.

The memory device 20 generates a signature Mm=RSA_Sign(Mpriv,H), writes it to a public key certificate Mcert, and transmits the public key certificate Mcert and the random number M to the host device 10.

Step ST13

In step ST13, the host device 10 receives the random number M and memory certificate Mcert from the memory device 20 (Challenge and Response by Memory).

The host device 10 verifies that the type of the certificate Mcert is 0002h. If the verification is unsuccessful, the protocol is halted.

The host device 10 verifies the signature of the certificate Mcert. If the verification of the signature is unsuccessful, the protocol is halted.

The host device 10 verifies the signature Mm using a public key RSA_Verify(Mpub,Mm,H).

If the verification is successful, the host device 10 generates a random number of tens or hundreds of bits and uses it as a session key.

The host device 10 generates an encrypted session key EK=RSA_Enc(Mpub,K) of the memory device 20, and generates a signature Hm=RSA_Sign(Hpriv,M∥EK).

The host device 10 transmits the encrypted session key EK and signature Hm thus generated to the memory device 20.

Step ST14

In step ST14, the memory device 20 verifies the received signature Hm using a public key RSA_Verify(Hpub,Hm, M∥EK). If the verification is unsuccessful, the protocol is halted.

The memory device 20 decrypts the encrypted session key EK using a private key RSA_Dec(Mpriv,K) to acquire a session key K.

Thereafter, the memory device 20 transits from the initial state ST0 to the state ST1 in which the session key is shared.

The memory device 20 then issues a process complete notification to the host device 10.

When authentication is completed as described above, the revocation information synchronization sequence is carried out.

Figure 11:
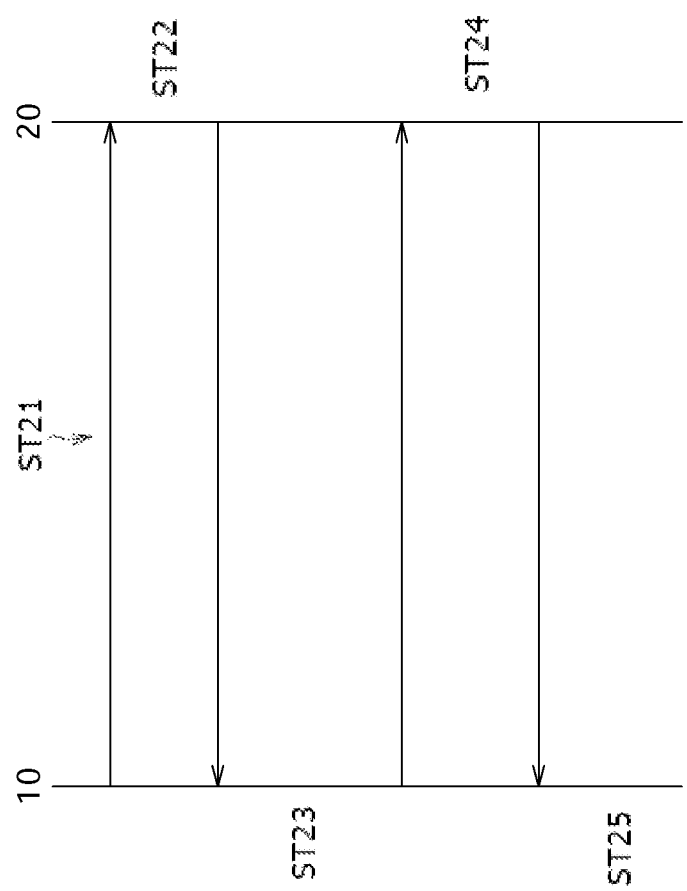
FIG. 11 is a schematic view explanatory of a first example of a revocation information synchronization sequence used by the embodiment.

FIG. 11 is a schematic view explanatory of a first example of the revocation information synchronization sequence used by the embodiment.

The first example is a synchronization sequence in which the host device 10 and the memory device 20 have the same revocation information RVK.

Step ST21

In step ST21, the host device 10 transmits to the memory device 20 a request for the revocation information version.

Step ST22

In step ST22, the memory device 20 generates a MAC value Mm=MAC(K,Mver) in response to the version request.

Mver denotes the version information about the revocation information possessed by the memory device 20.

The memory device 20 transmits the version Mver of the revocation information and the MAC value to the host device 10.

Step ST23

In step ST23, the host device 10 verifies the received MAC value Mm using MAC(K,Mver). In this case, a comparison is made between the version Hver of the revocation information possessed by the host device 10 and the version Mver of the revocation information owned by the memory device 20.

In this example, the host device 10 and the memory device 20 have the same revocation information RVK. Thus the host device 10 obtains a result Hver=Mver from the comparison.

The host device 10 notifies the memory device 20 by transmission that the two devices have the revocation information of the same version.

Step ST24

Upon receipt of the information indicating that both devices have the revocation information of the same version in step S24, the memory device 20 verifies that the host device ID of the host device 10 is not included in the revocation information.

The memory device 20 then transits from the state ST1 in which the session key is shared to the state ST2 in which revocation information synchronization is completed.

Thereafter, the memory device 20 issues a process complete notification to the host device 10.

Step ST25

Upon receipt of the process complete notification in step ST25, the host device 10 verifies that the memory device ID of the memory device 20 is not included in the revocation information.

Figure 12:
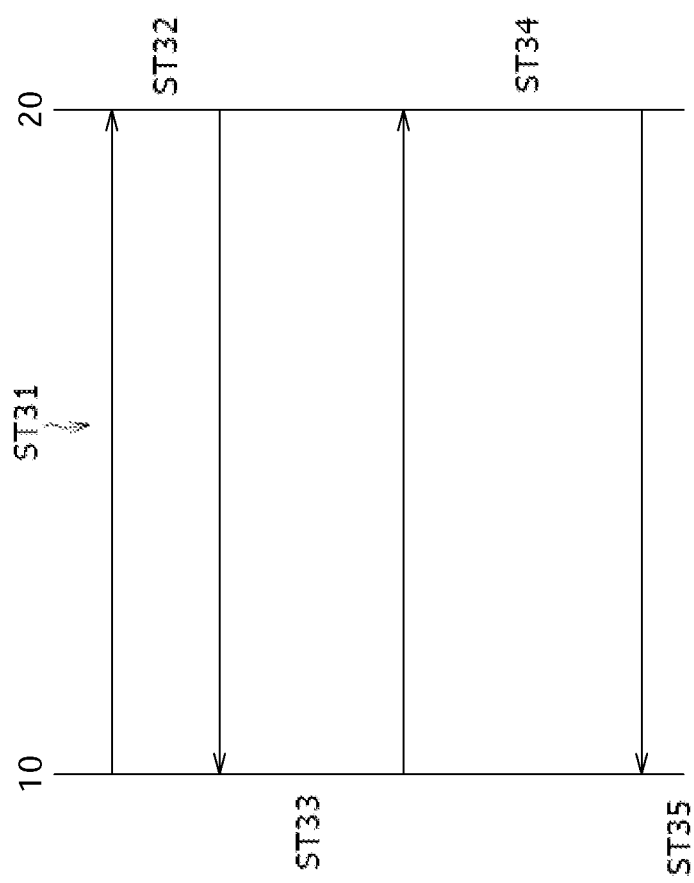
FIG. 12 is a schematic view explanatory of a second example of the revocation information synchronization sequence used by the embodiment.

FIG. 12 is a schematic view explanatory of a second example of the revocation information synchronization sequence used by the embodiment.

The second example is a synchronization sequence in which the revocation information RVK possessed by the host device 10 is newer than the revocation information RVK owned by the memory device 20.

Step ST31

In step ST31, the host device 10 transmits to the memory device 20 a request for the revocation information version.

Step ST32

In step ST32, the memory device 20 generates a MAC value Mm=MAC(K,Mver) in response to the version request.

Mver denotes the version information about the revocation information possessed by the memory device 20.

The memory device 20 transmits the version Mver of the revocation information and the MAC value to the host device 10.

Step ST33

In step ST33, the host device 10 verifies the received MAC value Mm using MAC(K,Mver). In this case, a comparison is made between the version Hver of the revocation information possessed by the host device 10 and the version Mver of the revocation information owned by the memory device 20.

In this example, the revocation information RVK of the host device 10 is newer than the revocation information RVK of the memory device 20. The host device 10 thus obtains a result Hver>Mver from the comparison.

The host device 10 generates a MAC value Hm=MAC(K, Hver), and transmits the revocation information of the host device 10 and the MAC value Hm=MAC(K,Hver) to the memory device 20.

Step ST34

In step ST34, the memory device 20 verifies the received MAC value Hm using MAC(K,Hver).

The memory device 20 verifies that Hver>Mver. That is, the memory device 20 verifies that the version Hver of the revocation information possessed by the host device 10 is newer than the version Mver of the revocation information owned by the memory device 20.

The memory device 20 verifies the revocation information of the host device 10 transmitted from the host device 10 using a public key LApub. If the verification is successful, the memory device 20 updates its revocation information using the received revocation information from the host device 10.

The memory device 20 verifies that the host device ID of the host device 10 is not included in the revocation information.

The memory device 20 then transits from the state ST1 in which the session key is shared to the state ST2 in which revocation information synchronization is completed.

Thereafter, the memory device 20 issues a process complete notification to the host device 10.

Step ST35

In step ST35, upon receipt of the process complete notification, the host device 10 verifies that the memory device ID of the memory device 20 is not included in the revocation information.

Figure 13:
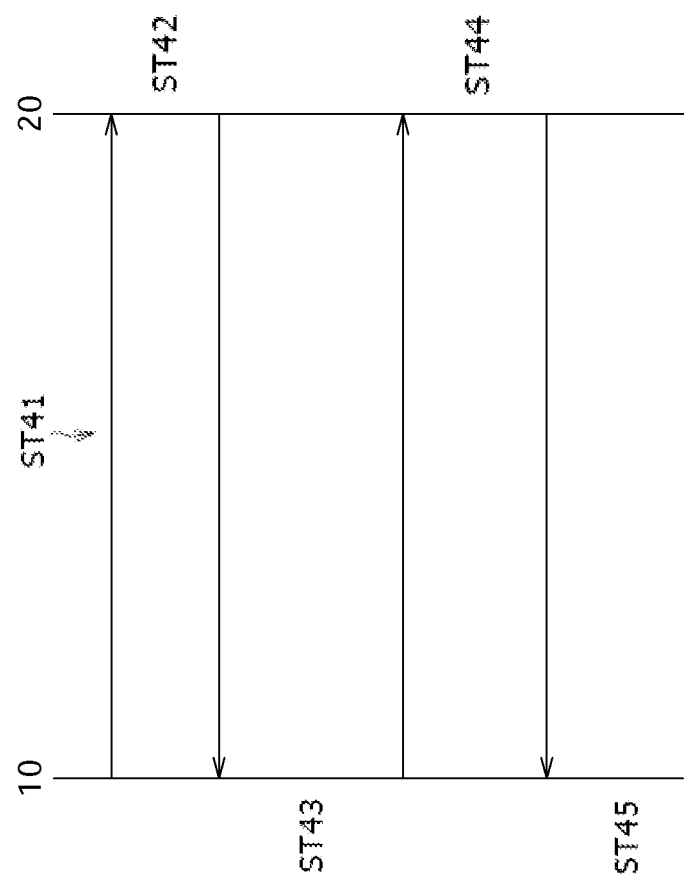
FIG. 13 is a schematic view explanatory of a third example of the revocation information synchronization sequence used by the embodiment.

FIG. 13 is a schematic view explanatory of a third example of the revocation information synchronization sequence used by the embodiment.

The third example is a synchronization sequence in which the revocation information RVK of the memory device 20 is newer than the revocation information of the host device 10.

Step ST41

In step ST41, the host device 10 transmits to the memory device 20 a request for the revocation information version.

Step ST42

In step ST42, the memory device 20 generates a MAC value Mm=MAC(K,Mver) in response to the version request.

Mver denotes the version information about the revocation information possessed by the memory device 20.

The memory device 20 transmits the version Mver of the revocation information and the MAC value to the host device 10.

Step ST43

In step ST43, the host device 10 verifies the received MAC value Mm using MAC(K,Mver). In this case, a comparison is made between the version Hver of the revocation information possessed by the host device 10 and the version Mver of the revocation information owned by the memory device 20.

In this example, the revocation information RVK of the memory device 20 is newer than the revocation information RVK of the host device 10. The host device 10 thus obtains a result Hver<Mver from the comparison.

The host device 10 requests the memory device 20 to transmit its revocation information.

Step ST44

In step ST44, the memory device 20 verifies that the host device ID of the host device 10 that requested the revocation information from the memory device 20 is not included in the revocation information of the memory device 20.

The memory device 20 then transits from the state ST1 in which the session key is shared to the state ST2 in which revocation information synchronization is completed.

The memory device 20 transmits its revocation information to the host device 10.

Step ST45

In step ST45, the host device 10 verifies the received revocation information from the memory device 20 using the public key LApub. If the verification is successful, the host device 10 updates its revocation information using the received revocation information from the memory device 20.

The host device 10 then verifies that the memory device ID of the memory device 20 is not included in the revocation information.

What follows is an explanation of a secret area data acquisition sequence.

Figure 14:
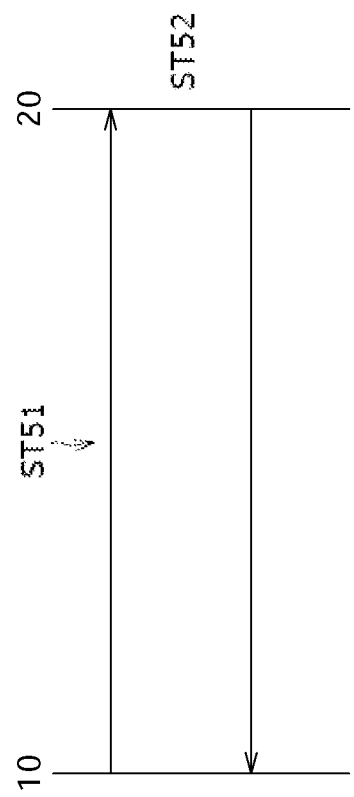
FIG. 14 is a schematic view explanatory of a secret area data acquisition sequence used by the embodiment.

FIG. 14 is a schematic view explanatory of the secret area data acquisition sequence used by the embodiment.

Step ST51

In step ST51, the host device 10 requests secret area data from the memory device 20.

Step ST52

In step ST52, upon receipt of the request for the secrete area data from the host device 10, the memory device 20 verifies that the current state is the state ST2 in which revocation information synchronization is completed.

If the current state is verified to be the state ST2 in which revocation information synchronization is completed, the memory device 20 concludes that the process of revocation information synchronization is completed and transmits the secret area data to the host device 10.

If the current state is not verified to be the state ST2, the memory device 20 concludes that the process of revocation information synchronization has yet to be completed and starts an error handling process without transmitting the secret area data to the host device 10.

The preceding explanation of the revocation information synchronization sequence focused on the case where the host device 10 is the principal actor requesting the revocation information version from the memory device 20.

The present embodiment can also be applied to a revocation information synchronization sequence in which the memory device 20 is the principal actor requesting the revocation information version from the host device 10.

FIG. 15 is a schematic view explanatory of a first example of the revocation information synchronization sequence in which the memory device 20 embodying the application is the principal actor.

The first example in a synchronization sequence in which the host device 10 and the memory device 20 have the same revocation information RVK.

Step ST61

In step ST61, the memory device 20 transmits to the host device 10 a request for the revocation information version.

Step ST62

In step ST62, the host device 10 generates a MAC value Hm=MAC(K,Hver) in response to the version request.

Hver denotes the version information about the revocation information possessed by the host device 10.

The host device 10 transmits the version Hver of the revocation information and the MAC value to the memory device 20.

Step ST63

In step ST63, the memory device 20 verifies the received MAC value Hm using MAC(K,Hver). In this case, a comparison is made between the version Mver of the revocation information possessed by the memory device 20 and the version Hver of the revocation information owned by the host device 10.

In this example, the memory device 20 and the host device 10 have the same revocation information RVK. Thus the host device obtains a result Mver=Hver from the comparison.

The memory device 20 notifies the host device 10 by transmission that the two devices have the revocation information of the same version.

Step ST64

In step ST64, upon receipt of the information indicating that both devices have the revocation information of the same version, the host device 10 verifies that the memory device ID of the memory device 20 is not included in the revocation information.

The host device 10 then issues a process complete notification to the memory device 20.

Step ST65

Upon receipt of the process complete notification in step ST65, the memory device 20 verifies that the host device ID of the host device 10 is not included in the revocation information.

The memory device 20 then transits from the state ST1 in which the session key is shared to the state ST2 in which revocation information synchronization is completed.

FIG. 16 is a schematic view explanatory of a second example of the revocation information synchronization sequence in which the memory device 20 embodying the application is the principal actor.

The second example is a synchronization sequence in which the revocation information RVK of the host device 10 is newer than the revocation information RVK of the memory device 20.

Step ST71

In step ST71, the memory device 20 transmits to the host device 10 a request for the revocation information version.

Step ST72

In step ST72, the host device 10 generates a MAC value Hm=MAC(K,Hver) in response to the version request.

Hver denotes the version information about the revocation information possessed by the host device 10.

The host device 10 transmits the version Hver of the revocation information and the MAC value to the memory device 20.

Step ST73

In step S73, the memory device 20 verifies the received MAC value using MAC(K,Hver). In this case, a comparison is made between the version Mver of the revocation information possessed by the memory device 20 and the version Hver of the revocation information owned by the host device 10.

In this example, the revocation information RVK of the host device 10 is newer than the revocation information RVK of the memory device 20. The memory device 20 thus obtains a result Hver>Mver from the comparison.

The memory device 20 requests the host device 10 to transmit its revocation information.

Step ST74

In step ST74, the host device 10 verifies that the memory device ID of the memory device 20 that requested the revocation information of the host device 10 is not included in the revocation information.

The host device 10 transmits the revocation information to the memory device 20.

Step ST75

In step ST75, the memory device 20 verifies the received revocation information from the host device 10 using the public key LApub. If the verification is successful, the memory device 20 updates its revocation information using the revocation information received from the host device 10.

The memory device 20 then verifies that the host device ID of the host device 10 is not included in the revocation information.

Thereafter, the memory device 20 transits from the state ST1 in which the session key is shared to the state ST2 in which revocation information synchronization is completed.

FIG. 17 is a schematic view explanatory of a third example of the revocation information synchronization sequence in which the memory device 20 embodying the application is the principal actor.

The third example is a synchronization sequence in which the revocation information RVK of the memory device 20 is newer than the revocation information RVK of the host device 10.

Step ST81

In step ST81, the memory device 20 transmits to the host device 10 a request for the revocation information version.

Step ST82

In step ST82, the host device 10 generates a MAC value Hm=MAC(K,Hver) in response to the version request.

Hver denotes the version information about the revocation information possessed by the host device 10.

The host device 10 transmits the version Hver of the revocation information and the MAC value to the memory device 20.

Step ST83

In step ST83, the memory device 20 verifies the received MAC value using MAC(K,Hver). In this case, a comparison is made between the version Mver of the revocation information possessed by the memory device 20 and the version Hver of the revocation information owned by the host device 10.

In this example, the revocation information RVK of the memory device 20 is newer than the revocation information RVK of the host device 10. The memory device 20 thus obtains a result Mver>Hver from the comparison.

The memory device 20 generates a MAC value Mm=MAC(K,Mver), and transmits the revocation information and MAC value Mm=MAC(K,Mver) of the memory device 20 to the host device 10.

Step ST84

In step ST84, the host device 10 verifies the received MAC value Mm using MAC(K,Mver).

The host device 10 verifies that Mver>Hver. That is, the host device 10 verifies that the version Mver of the revocation information possessed by the memory device 20 is newer than the version Hver of the revocation information owned by the host device 10.

Using the public key LApub, the host device 10 verifies the revocation information transmitted from the memory device 20. If the verification is successful, the host device 10 updates its revocation information using the received revocation information from the memory device 20.

The host device 10 then verifies that the memory device ID of the memory device 20 is not included in the revocation information.

Thereafter, the host device 10 issues a process complete notification to the memory device 20.

Step ST85

In step ST85, upon receipt of the process complete notification, the memory device 20 verifies that the host device ID of the host device 10 is not included in the revocation information.

The memory device 20 then transits from the state ST1 in which the session key is shared to the state ST2 in which revocation information synchronization is completed.

The preferred embodiments of the present application have been described above in detail. However, they are not limitative of the present application. It is also possible to adopt the following arrangements:

The authentication scheme is not limited to RSA. For example, an authentication system based on symmetric key cryptography may be utilized.

According to the above-described embodiments, the host device cannot access the secret data in the memory device without completing revocation information synchronization between the two devices. That means the attempt to obtain the secret data fails if a third party blocks the synchronization of revocation information between the two devices involved.

The data exchanged during synchronization of the revocation information is guaranteed of its integrity by use of a session key acquired through authentication. This permits detection of possible data replacement attempted by a third party.

Because the revocation information is synchronized between the two devices involved always in conjunction with authentication therebetween, it is easy to propagate the revocation information.

It should be understood that the present application when embodied is not limited to the above-described embodiments and that various modifications, variations and alternatives may be made of the application so far as they are within the scope of the appended claims or the equivalents thereof.

The method discussed above in detail may be formed into a program which includes the steps making up the method and which is configured to be executed by a computer such as a CPU.

The program thus prepared may be stored on a recording medium such as semiconductor memory, magnetic disks, optical disks, or floppy (registered trademark) disks. The recording medium carrying the program may then be attached to a computer that may access and execute the program stored thereon.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A memory system comprising:
a host device; and
a memory device configured to communicate with said host device;
said host device including
a storage device configured to store at least certificate information issued by a certificate authority, public key information of said certificate authority for verifying a certificate, and revocation information identifying at least one revoked memory device and at least one revoked external device, and
a first control section configured to control access to said storage device and to have a function of communicating with an external memory device including a secret area for storing data of which the confidentiality upon connection is to be guaranteed,
said first control section has a function of exchanging said revocation information through communication between said host device and said external memory device in such a manner that a new version of said revocation information is transferred from one of the two devices in possession thereof to the other device possessing an old version of said revocation information for revocation information synchronization between said two devices, and
upon completion of a process of revocation information synchronization between said two devices, said first control section is allowed to access said secret area,
said memory device including
a storage section configured to store public key information of a certificate authority for verifying a certificate and revocation information identifying at least one revoked memory device and at least one revoked external device, and to include a secret area for storing data of which the confidentiality is to be guaranteed, and
a second control section configured to have a function of communicating with an external device and to control access to said secret area of said storage section at least in accordance with said revocation information,
said second control section has a function of exchanging said revocation information through communication between said memory device and said external device in such a manner that a new version of said revocation information is transferred from one of the two devices in possession thereof to the other device possessing an old version of said revocation information for revocation information synchronization between said two devices, and
said second control section inhibits access to said secret area unless a process of revocation information synchronization is completed between said two devices.

2. The memory system according to claim 1, wherein each of said first and said second control sections has a function of carrying out authentication, and sharing a session key, with an external communicating device before performing said process of revocation information synchronization therewith, each of said first and said second control sections further adding a signature to outgoing data using said session key when performing said process of revocation information synchronization.

3. The memory system according to claim 2, wherein, upon receipt of a certificate and signature information from said memory device in response to the transmitted certificate information authenticated by said certificate authority, said first control section verifies said certificate and acquires information for identifying at least said memory device;
   said first control section transmits an encrypted session key and a signature and receives a process complete notification in response to the transmission, thereby verifying that the session key is shared;
   upon receipt of certificate information authenticated by said certificate authority from said external device, said second control section acquires information for identifying at least said external device;
   said second control section adds a signature to an own certificate authenticated by said certificate authority before transmitting said own certificate together with verification information to said external device, said second control section further verifying an encrypted signature received from said external device in response to the transmitted authentication information; and
   upon successful conclusion of the verification, said second control section decrypts an encrypted key received from said external device along with the signature so as to share the session key therewith.

4. The memory system according to claim 1, wherein, upon receipt of version information about said revocation information in response to a transmitted request to send the version information about said revocation information, said first control section verifies whether the versions of said revocation information possessed by said host device and by said memory device are the same or one of the two versions is newer than the other, and transmits notification information reflecting the result of the verification;
   upon receipt of a process complete notification, said first control section verifies that said external device to which said notification information was transmitted is not included in said revocation information held in said storage device;
   upon receipt of a request to transmit version information about said revocation information from said host device, said second control section transmits said version information about said revocation information possessed by said memory device to said host device; and
   said second control section receives notification information indicating whether the versions of said revocation information possessed by said memory device and by said host device are the same or one of the two versions is newer than the other, said second control section further performing a process reflecting said notification information to complete said process of revocation information synchronization.

5. The memory system according to claim 4, wherein, upon verifying that said revocation information held in said storage device is newer than the received revocation information, said first control section transmits said revocation information from said storage device and a signature as said notification information;
   upon receipt of a process complete notification, said first control section verifies that said memory device to which said notification information was transmitted is not included in said revocation information held in said storage device;
   upon verifying that said revocation information held in said storage device is older than the received revocation information, said first control section transmits as said notification information a request to transmit said revocation information, receives said revocation information in response to said request, verifies the received revocation information, and updates said revocation information held in said storage device using said received revocation information;
   said first control section verifies that said memory device to which said notification information was transmitted is not included in said revocation information held in said storage device;
   upon receipt of the notification information indicating that the revocation information version is old, said second control section verifies the signature received along with said notification information;
   if said second control section verifies that said revocation information in said storage section is the older by comparing the version information about said revocation information included in said notification information from said host device with the transmitted version information about said revocation information, then said second control section updates said revocation information in said storage section using the received revocation information;
   said second control section verifies that said host device from which said notification information was transmitted is not included in said revocation information held in said storage section;
   upon successful conclusion of the verification, said second control section completes said process of revocation information synchronization;
   upon receipt of a request as part of said notification information to transmit said revocation information held in said storage section, said second control section assumes that said revocation information is the newer and verifies that said host device from which said notification information was transmitted is not included in said revocation information held in said storage section; and
   upon successful conclusion of the verification, said second control section transmits said revocation information to complete said process of revocation information synchronization.

6. The memory system according to claim 1, wherein, upon receipt of a request to transmit data held in said secret area, said second control section verifies that said process of revocation information synchronization is completed, before transmitting the data from said secret area.

* * * * *